United States Patent [19]
Tan

[11] 4,103,244
[45] Jul. 25, 1978

[54] FSK DEMODULATOR
[75] Inventor: Yoichi Tan, Tokyo, Japan
[73] Assignee: Nippon Electric Co., Ltd., Tokyo, Japan
[21] Appl. No.: 785,702
[22] Filed: Apr. 7, 1977
[30] Foreign Application Priority Data
Apr. 9, 1976 [JP] Japan ................... 51-40656
[51] Int. Cl.² ............................................. H03D 3/00
[52] U.S. Cl. ..................................... 329/122; 325/419
[58] Field of Search ............... 329/112, 122, 123, 124, 329/125; 325/419, 420, 421, 422, 423

Primary Examiner—John Kominski
Attorney, Agent, or Firm—Sughrue, Rothwell, Mion, Zinn and Macpeak

[57] ABSTRACT

An FSK demodulator is provided with an AFC circuit. The AFC circuit is a negative feedback loop having at least $n$ stable points corresponding to $n$-level transmitting frequencies. The cut-off frequency of the negative feedback loop is selected higher than the cut-off frequency of the low frequency components from the $n$-level signals containing a D.C. component which are used to generate the transmitting frequencies.

12 Claims, 26 Drawing Figures

FSK DEMODULATOR

BACKGROUND ON THE INVENTION

The present invention relates to a demodulator for a digital signal transmission system employing FSK (Frequency Shift Keying) modulation, and more particularly, to an FSK demodulator having an AFC (Automatic Frequency Control) circuit.

An FSK modulation/demodulation system is the system in which digital signals such as, "0" and "1" are made to correspond to different transmission frequencies such as $f_0$ and $f_1$, respectively, and these frequencies are transmitted in accordance with the digital signals.

In view of the information transmission efficiency, modulation signals (base band signals) such as an NRZ (Non Return to Zero) signal are desirable as a digital signal, but this NRZ signal cannot be faithfully transmitted through a transmission system in which a D.C. component is cut off such as, the conventional FDM-FM (Frequency Division Multiplex-Frequency Modulation) transmission path, because it contains a D.C. component in its power spectrum. Consequently, heretofore, upon transmission of information employing FSK modulation, either the NRZ signal was converted, for example, into bipolar pulses not containing a D.C. component in their power spectrum and then passed through the FDM-FM transmission path at the sacrifice of the transmission efficiency, or the NRZ signal was band-suppressed and then passed through the FM transmission path which passes a D.C. component, at the sacrifice of the frequency stability. The former solution had a disadvantage that an NRZ-bipolar converter is necessitated, the construction becomes relatively complexed, and further, the chance of occurrence of bit errors at this part is so much increased. Also, the latter solution had a disadvantage that due to the band-suppression of the NRZ signal, an amplitude modulation component is produced in this signal, and because the frequency band is broadened when passing through a non-linear part, further band-suppression is repeated, resulting in occurrence of bit errors.

To stabilize the transmitting or receiving frequency, the conventional AFC circuit has a negative feedback circuit having one frequency-stable point which is formed of a frequency discriminator circuit and a voltage-controlled oscillator. Although this circuit is effective for frequency stabilization of a transmission system in which a base band signal contains no D.C. component such as the FDM-FM transmission system and for frequency stabilization of an unmodulated carrier wave, the circuit is not effective in a transmission system in which the center frequency of the modulated wave and its average frequency do not always coincide with each other as in the case of the FSK transmission system employing NRZ signals. For instance, the center frequency $f_x$ of a signal that is FSK-modulated to a frequency $f_0$ upon "0" and to a frequency $f_1$ upon "1" in response to a bi-level NRZ signal, is selected at $f_x = (f_0 + f_1)/2$, and therefore, there is a disadvantage that when either one frequency $f_1$ or $f_2$ continues for a long period, the center frequency of the signal and the center frequency of the transmission path differ from each other, and thus a bit error rate is increased.

SUMMARY OF THE INVENTION

One object of the present invention is to provide an FSK demodulator apparatus, in which even if digital information containing a D.C. component such as NRZ pulses is transmitted as FSK-modulated with the D.C. component cut off on the transmitter side, it is made possible on the receiver side to receive the digital information at a small bit error rate of the same order as the D.C. coupled case.

Another object of the present invention is to provide an FSK demodulator apparatus employing an excellent AFC circuit.

One feature of the present invention is the provision of an FSK demodulator apparatus for receiving and demodulating an FSK-modulated signal that is transmitted with $n$ transmitting frequencies made to correspond to $n$-level ($n$ being a positive integer equal to or larger than 2) information signals, respectively, characterized in that a negative feedback loop having at least $n$ stable points corresponding to said $n$-level transmitting frequencies is provided in the receiving and demodulating system.

BRIEF DESCRIPTION OF THE DRAWINGS

The present invention will now be described with reference to the accompanying drawings, in which:

FIG. 3 is a diagram showing an FSK signal to be transmitted;

DESCRIPTION OF THE PREFERRED EMBODIMENTS

Figures 1, 2, 3A, 3B, 4A:
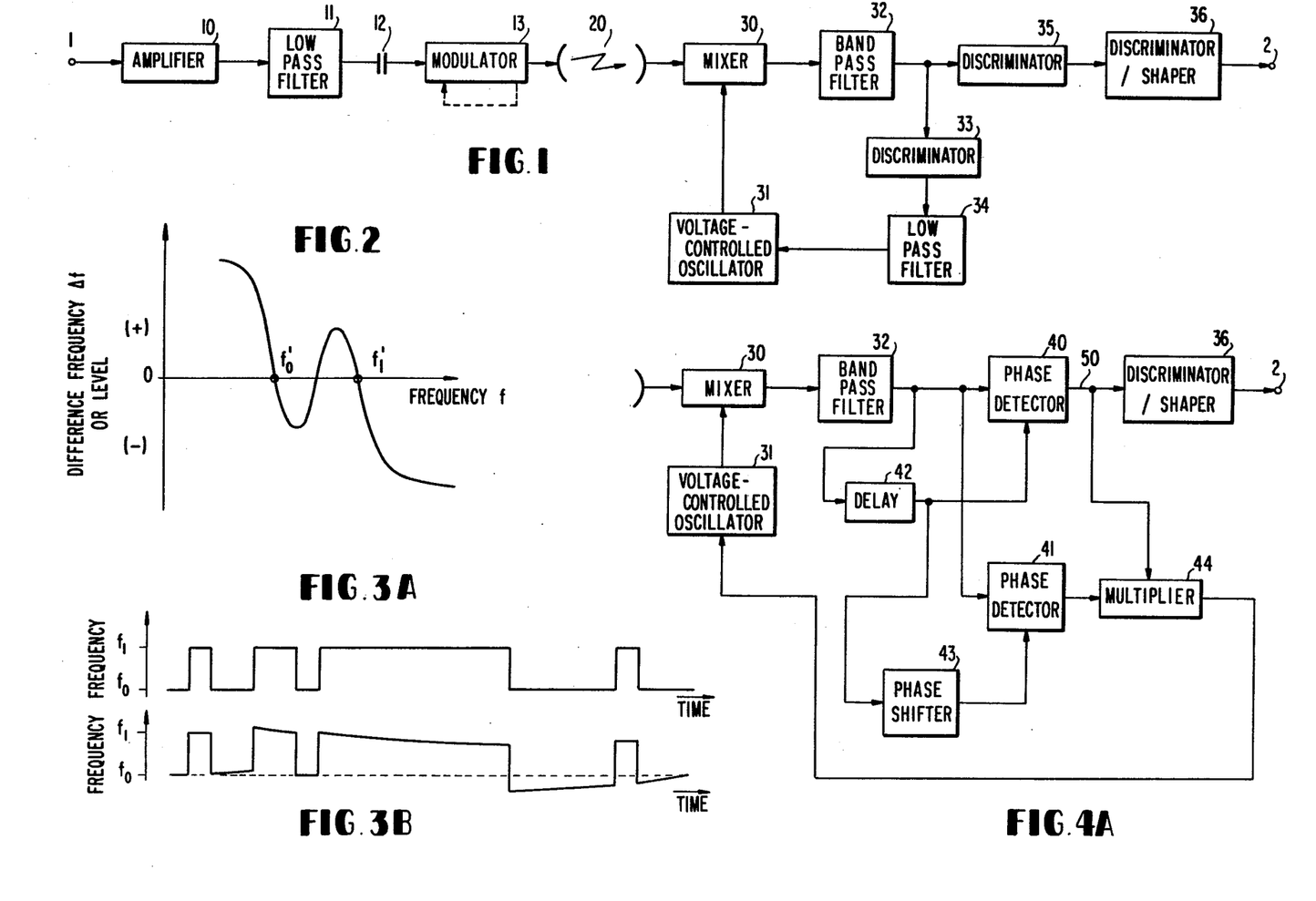
FIG. 1 is a block diagram of one example of the FSK demodulator apparatus according to the present invention as applied to an FSK transmission system.
FIG. 2 is a characteristic curve diagram of an automatic frequency control loop in the apparatus shown in FIG. 1.
FIGS. 4A, 4B and 4C are block diagrams showing other examples of the FSK demodulator apparatuses according to the present invention.

Referring now to FIG. 1, one example of the FSK demodulator apparatus according to the present invention as applied to an FSK transmission system is shown in block form. In FIG 1, on a transmitter side, NRZ pulses are amplified in an amplifier 10, band-suppressed in a low-pass filter 11, D.C. cut off by a capacitor 12, and fed to an FSK modulator 13 as a modulation signal. Thereby, an FSK-modulated signal is transmitted through a transmission path 20. On a receiver side, in a frequency converter or mixer 30 the FSK-modulated signal is mixed with a local signal fed from a voltage-controlled oscillator 31 to be converted into an intermediate frequency signal. This signal is fed through an intermediate frequency band-pass filter 32 to a frequency discriminator 35, and the NRZ pulses are reproduced in a discriminator/shaper circuit 36 and derived as an output at a terminal 2. The output of the band-pass filter 32 is also fed to a frequency discriminator 33. This discriminator 33 is constructed so as to have $n$ frequency-stable points, for example, in correspondence to an $n$-level ($n$ being a positive integer equal to or larger than 2) FSK signal. A D.C. component in this output is derived by a low-pass filter 34, and the oscillator 31 is controlled by this D.C. output.

The discrimination characteristics of the frequency discriminator 33 are selected, in the case of bi-level FSK, so as to have two stable points $f_0'$ and $f_1'$ for an input frequency $f_m$, where a frequency increment $\Delta f$ generated at the filter 32 in response to an intermediate frequency signal fed from the band-pass filter 32 after one circulation through the negative feedback loop consisting of discriminator 33 filter 34 → oscillator 31 → frequency converter 30 → band-pass filter 32 → discriminator 33 (open loop) is equal to zero as shown in FIG. 2. These stable points $f_0'$ and $f_1'$ take the values obtained by converting the frequencies $f_0$ and $f_1$, corresponding to the digital information on the transmitter side into intermediate frequencies by the frequency converter 30 on the receiver side. If the input information is $f_0$, the intermediate frequency output is stabilized at the frequency $f_0'$, while if the former is $f_1$, the latter is stabilized at the frequency $f_1'$. In the heretofore known AFC device, the frequency discriminator has a single stable point, which is selected at a frequency $f_c$ at the midpoint between the frequencies $f_0'$ and $f_1'$. Accordingly, if the frequency $f_0$ or $f_1$ continues for a long period as an input signal, the apparatus operates so that the intermediate frequency may change to $f_c$, and so, it becomes unable to operate correctly. However, the demodulator apparatus according to the present invention is free from such disadvantages. As shown in FIG. 3A, in case that a signal is FSK-modulated and transmitted with D.C. coupling, then, of course, the signal can be demodulated correctly. If NRZ pulses have their D.C. component removed by the capacitor 12 as shown in FIG. 1, then when the same code continues the frequency would vary as shown in FIG. 3B. That is, in this figure the frequency would drift gradually from $f_1$ to the average frequency. The rate of the frequency drift is determined by the time constant that is a product of a capacity of the capacitor 12, an output impedance of the filter 11 and an input impedance of the modulator 13. A time constant of the AFC loop which controls the oscillator 31 by negative feedback, is selected smaller than this time constant. Then, the frequency drift on the transmitter side is completely followed by the AFC loop on the receiver side, so that the frequency drift corresponding to the D.C. component lost on the receiver side can be reproduced by an oscillation frequency variation of the oscillator 31, and at the output of the band-pass filter 32 is obtained an FSK intermediate frequency signal similar to the case of the above-described FM transmission path in which D.C. coupling is made.

A detailed example of the AFC circuit according to the present invention having a plurality of frequency stable points, is illustrated in FIG. 4A. In the subsequent figures, it is to be noted that circuit elements represented by like numerals have the same functions. In FIG. 4A, an intermediate frequency output of a band-pass filter 32 is fed to first and second frequency discriminators (phase detector circuits) 40 and 41 which detect a phase difference with a modulo $2\pi$. In addition, the above-mentioned intermediate frequency output is delayed by a predetermined period that is less than one bit period and then applied to the first phase detector circuit 40. On the other hand, a part of the delayed intermediate frequency signal is phase-shifted by $\pi/2$ in a phase-shifter 43 and is fed to the second phase detector circuit 41. The outputs of the respective detector circuits 40 and 41 are multiplied in a multiplier circuit 44 so that a center level may be emitted as an output at the frequencies where the output of one of the phase detector circuits takes the maximum and the minimum levels, and the response to frequency variation may have the same polarity. This output controls the oscillator 31 in such manner that the intermediate frequency output may be raised when the output is positive.

Figure 5A:
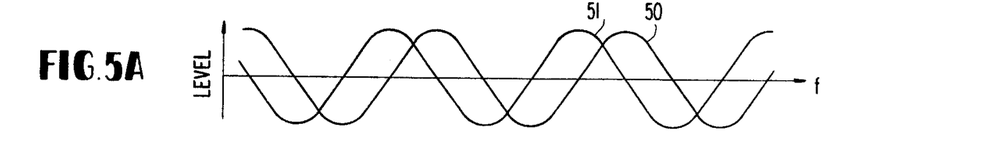
FIG. 5 is a waveform diagram showing frequency-response waveforms at various points in FIGS. 4A, 4B and 4C for explaining the operation of the same apparatus.
Figures 5B, 5C:
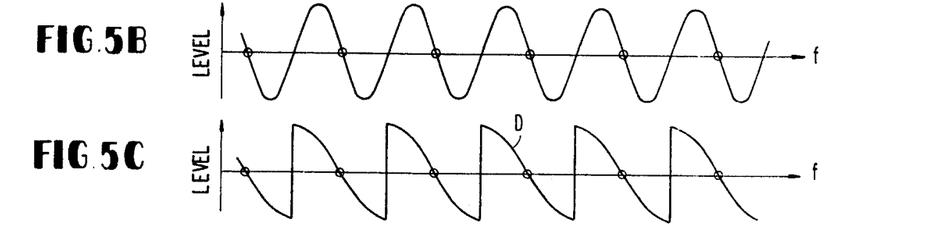

Representing the delay time of the delay circuit 42 by $\tau$ and the frequency of the intermediate frequency signal by $f_c$, when the frequency is varied to $f_c \pm \Delta f$, a phase variation $\Delta \phi$ at the output of the delay circuit 42 will take the following value:

$$\Delta \phi = \pm 2\pi \Delta f \tau + \phi_0,$$

where $\phi_0$ represents the valve of $\Delta \phi$ when the input frequency is equal to $f_c$. The phase variation $\Delta \phi$ for this frequency variation is detected by the first phase detector circuit 40, and in case that the phase comparison characteristic of this circuit 40 is a sinusoidal characteristic, it would vary sinusoidally as shown by curve 50 in FIG. 5A, while the output of the second phase detector circuit 41 is phase-shifted by 90° with respect to the curve 50 as shown by curve 51. A multiplied output of these curves 50 and 51 takes the form shown in FIG. 5B, and thereby an AFC circuit having stable points at $f_c \pm (1/4\tau), f_c \pm (3/4\tau), \ldots$, can be obtained. Accordingly, if the values of $f_0'$ and $f_1'$ of the above-described FSK are selected at $\pm(1/4\tau)$, then AFC can be applied while monitoring a frequency for each bit.

Figure 4B:
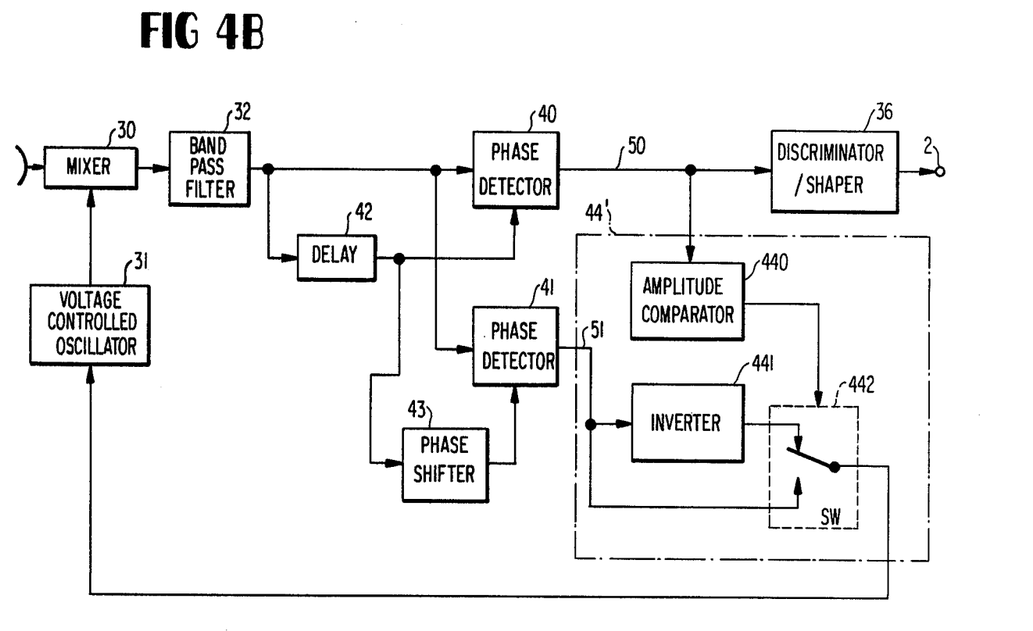
Figure 4C:
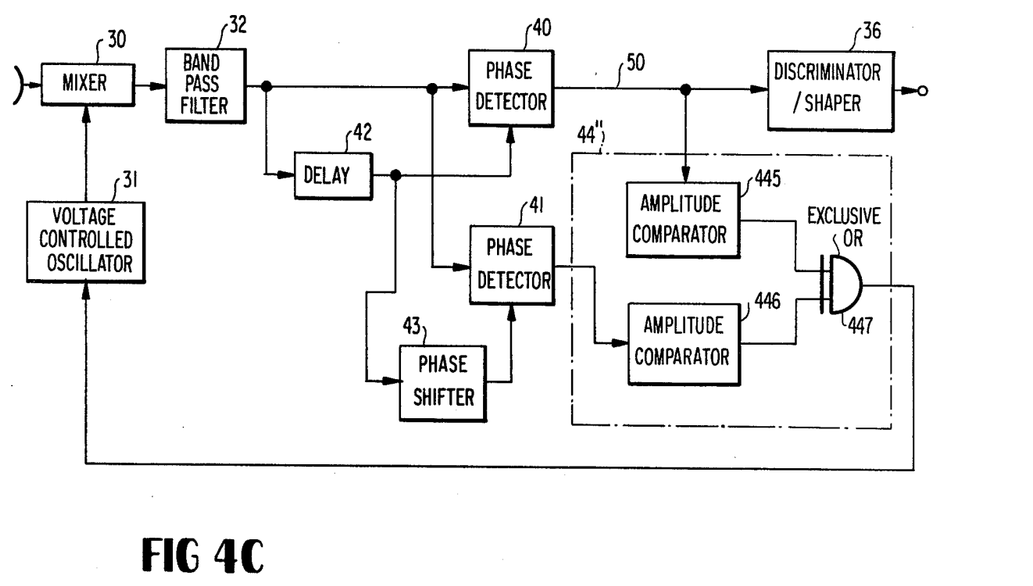

The circuits 44' and 44" shown in FIGS. 4B and 4C may be used in place of the multiplier circuit 44 shown in FIG. 4A. In FIG. 4B, the circuit 44' comprises an amplitude comparator circuit 440 for detecting whether the output of the phase detector 40 is positive or negative, an inverter circuit 441, and a switch 442. The switch 442 selects the outputs of the phase detector 41 and the inverter circuit 441 depending on the output of the amplitude comparator circuit 440, resulting in an output as shown in FIG. 5C.

In the circuit 44' of FIG. 4C, the amplitude comparator circuits 445 and 446 convert the positive or negative sign of the respective outputs of the phase detector circuits 40 and 41 to a logic "1" or "0" level, respectively. By the use of a circuit 447 having an Exclusive-OR function, an output as shown in FIG. 5D is obtained.

Figure 5D:
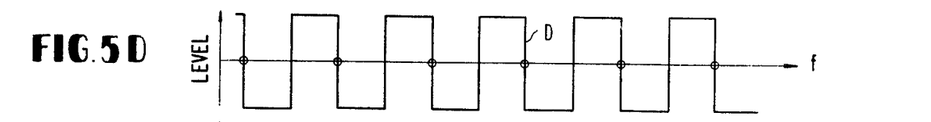
Figures 5E, 5F:
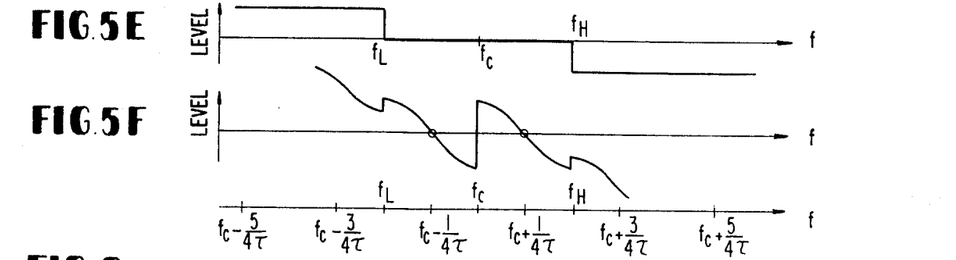
Figure 6:
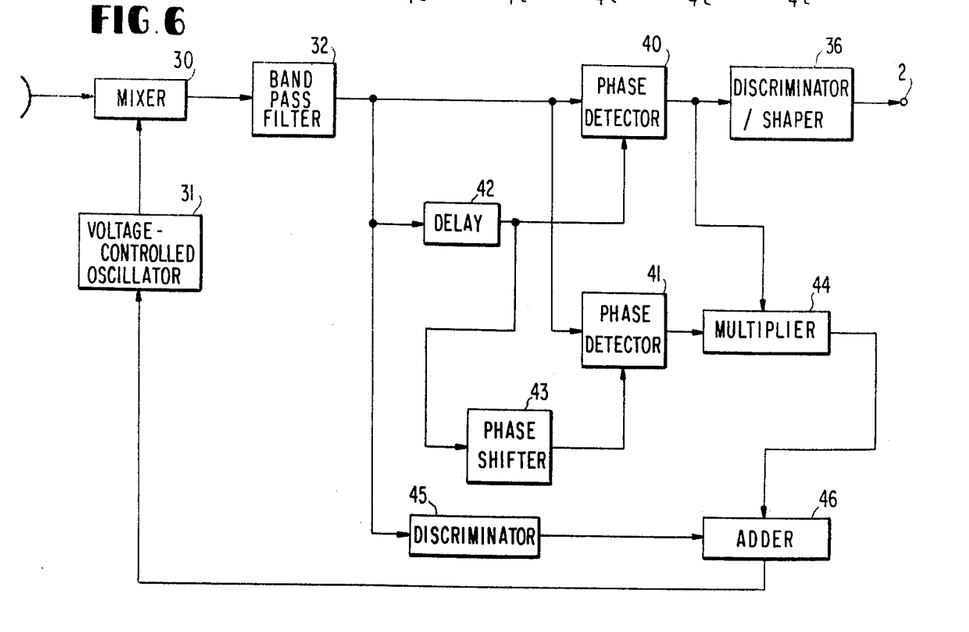
FIG. 6 is a block diagram showing still another example of the FSK demodulator apparatus according to the present invention.

An AFC circuit having discrimination characteristics as shown in FIGS. 5B, 5C or 5D is satisfactorily available in case where a frequency variation width caused in a transmission system is smaller than a frequency shift of FSK modulation. However, if the frequency variation width caused in the transmission system is larger than the frequency shift of FSK modulation, then there is a concern that in the AFC circuit the frequency may be pulled in the stable points other than $f_c \pm (1/4\tau)$, such as $f_c \pm (3/4\tau), \ldots$. Therefore, in order to remove the above-mentioned undesired stable points, for example, the intermediate frequency output is also applied to another frequency discriminator 45 as shown in FIG. 6. In this frequency discriminator 45, the frequency of the intermediate frequency output is discriminated to generate a step-like signal as shown in FIG. 5E, which takes a sufficiently high positive voltage at a frequency equal to or lower than $f_c - (2/4\tau)(= f_L)$, which takes a sufficiently low negative voltage at a frequency equal to or higher than $f_c + (2/4\tau)(= f_H)$, and which takes zero voltage in the frequency range of $f_c - (2/4\tau) < f < f_c + 2/4\pi$. By adding the output (FIG. 5E) of the circuit 45 to the output (FIG. 5B) of the multiplier circuit 44 in an adder circuit 46, the characteristics shown in FIG. 2 can be obtained. Or else, by adding in an analog manner the output (FIG. 5C) of the circuit 44 with the output of the circuit 45, the characteristics shown in FIG. 5F can be obtained.

Figure 7:
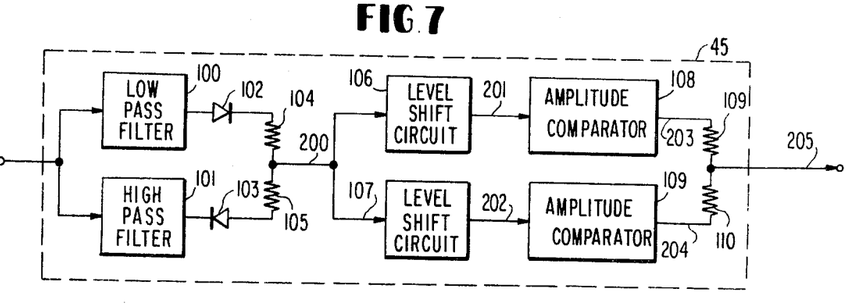
FIG. 7 shows one example of a detailed circuit construction of the circuit block 45 in FIG. 6.
Figure 8A:
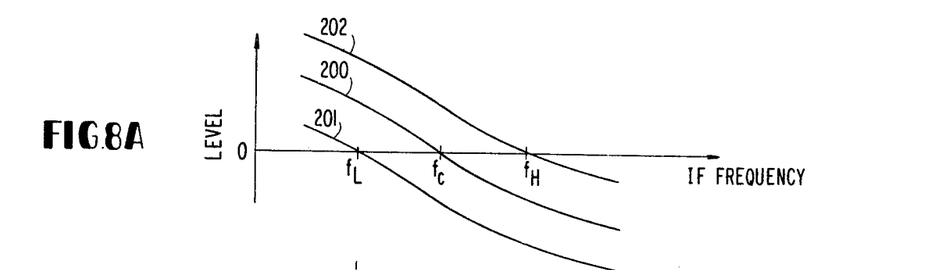
FIG. 8 is a waveform diagram showing frequency response characteristics waveforms at various points in FIG. 7.
Figure 8B:
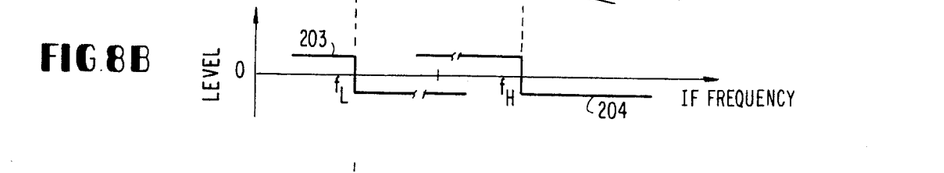
Figure 8C:
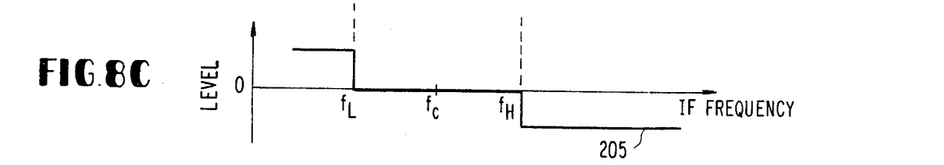

In FIG. 7 is shown one example of a more detailed block diagram of the discriminator circuit 45 in FIG. 6. With reference to FIG. 7, reference numeral 100 designates a low-pass filter; 101, a high-pass filter; 102 and 103, detectors; 104, 105, 109 and 110, resistors; 106 and 107, level shift circuits; 108 and 109, amplitude comparator circuits; and 200 to 205, waveforms at various points in this circuit. A general frequency discriminator circuit is composed of the low-pass filter 100, high-pass filter 101, detectors 102 and 103 and resistors 104 and 105. Here it is assumed that the output 200 of this general frequency discriminator circuit has a frequency response waveform as shown in FIG. 8A. This output 200 is level-shifted in the level shift circuits 106 and 107, respectively, to the frequency response waveforms 201 and 202 in FIG. 8A. These outputs 201 and 202 are converted into the waveforms 203 and 204, respectively, in FIG. 8B in the amplitude comparators (for instance, 0-level detectors) 108 and 109, respectively. These outputs are combined by means of the resistors 109 and 110, and thereby a waveform as shown in FIG. 8C (or FIG. 5F) can be obtained.

Figure 9:
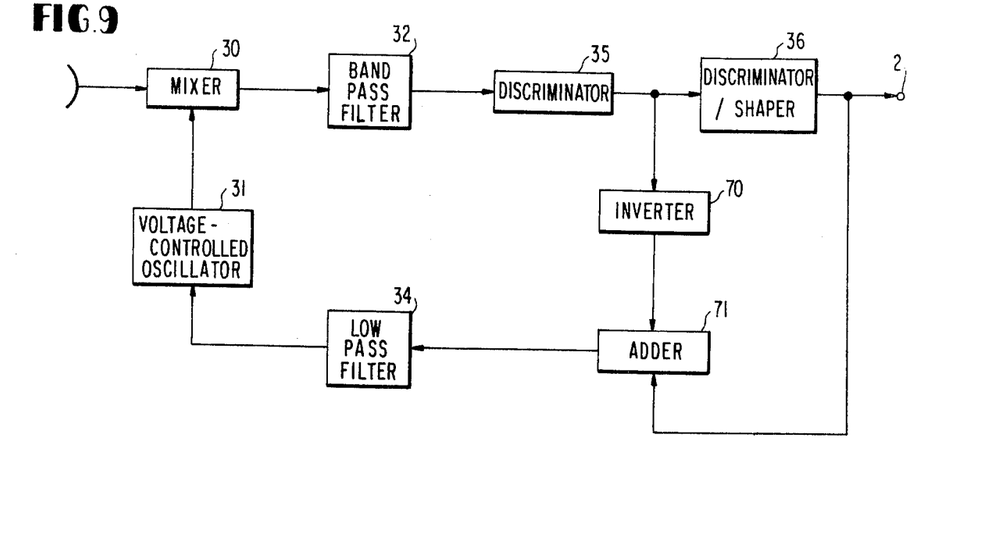
FIG. 9 is a block diagram showing yet another example of the FSK demodulator apparatus according to the present invention.
Figure 10A:
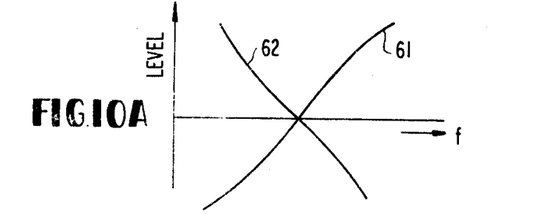
FIG. 10 is a waveform diagram showing frequency-response characteristics waveforms at various points in FIG. 9 for explaining the operation of the same apparatus.
Figure 10B:
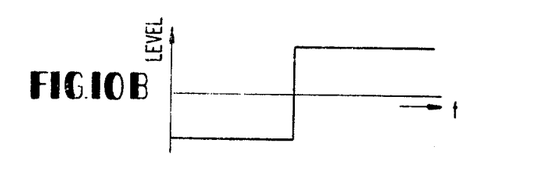
Figure 10C:
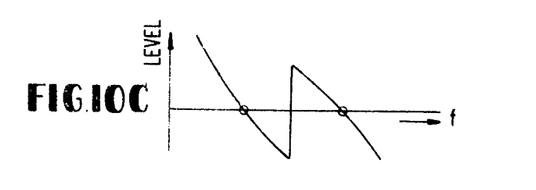

Referring now to FIG. 9, as still another example of a circuit for obtaining the characteristics shown in FIG. 2, an output of a frequency discriminator circuit 35 (curve 61 in FIG. 10A) could be inverted by an inverter circuit 70 into curve 62, and the characteristics shown in FIG. 10C could be obtained by adding this inverted output with an output (FIG. 10B) of a discriminator shaper circuit 36 in an adder circuit 71. The output (FIG. 10C) of the adder circuit 71 is fed to VCO 31 through the low-pass filter 34.

Figure 11:
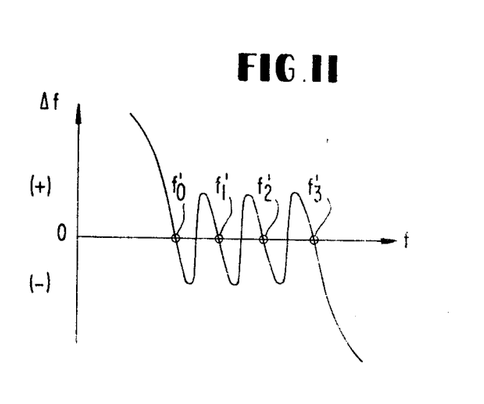
FIG. 11 shows a characteristic curve of an automatic frequency control loop for a 4-level FSK-modulated signal.

Discrimination characteristics of a negative feedback loop for a 4-level FSK-modulated signal are provided with at least four frequency-stable points as shown in FIG. 11. In general, at least $n$ stable points are provided for an $n$-level FSK-modulated wave, and these characteristics can be easily obtained by making use of the characteristics shown in FIGS. 5B, 5C, 5D, etc.

Figure 12:
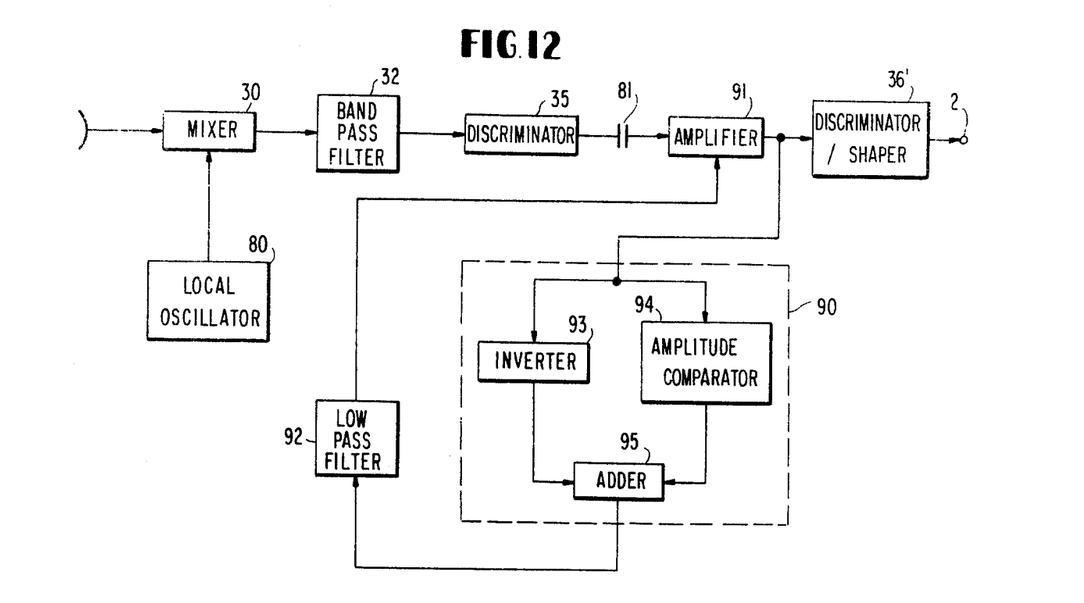
FIG. 12 is a block diagram showing a still further example of the FSK demodulator apparatus according to the present invention.

In the above description an automatic frequency control loop was formed for a local oscillator in a receiving/demodulating system for an FSK-modulated signal and $n$ stable points were given to that loop. However, a negative feedback loop could be provided in a base band processing portion and $n$ stable points could be given to this negative feedback loop. For example, as shown in FIG. 12, in the frequency converter 30, the FSK-modulated signal is mixed with a local signal fed from a local oscillator 80 to be converted into an intermediate frequency signal. This signal is fed through the band-pass filter 32 to the frequency discriminator 35. The output of the frequency discriminator 35 is fed to a negative feedback type D.C. amplifier 91 via a capacitor 81, and an output of the amplifier 91 is fed to a discriminator/shaper circuit 36' and also to a level discriminator 90 having a function similar to the frequency discriminator 33 in FIG. 1. Taking the input level for the discriminator 90 along the abscissa in FIG. 2 and an increment of the output level of the D.C. amplifier 91 after one circulation through the loop (open loop) along the ordinate, then the characteristics of this discriminator 90 can be represented by the same curve as the characteristics of the discriminator 33. These characteristics can be obtained on the basis of the same concept as that shown, for example, in FIG. 10. (But the abscissa in FIG. 10 is modified to represent a voltage.) More particularly, as the amplifier 91 a differential amplifier is employed, the amplifier has an output-level characteristic corresponding to curve 61 in FIG. 10A, its output is inverted by an inverter 93 into an output corresponding to curve 62 in FIG. 10A. On the other hand, the output of the amplifier 91 is also fed to the amplitude comparator (for instance, a level detector) 94 to obtain an output corresponding to the characteristic shown in FIG. 10B. The output of the comparator 94 is added to the output of the inverter 93 in an adder circuit 95 to obtain the output corresponding to the curve in FIG. 10C. Here it is assumed that a time constant determined by the capacitor 81 is sufficiently larger than the loop time constant determined by the filter 92.

Figure 13:
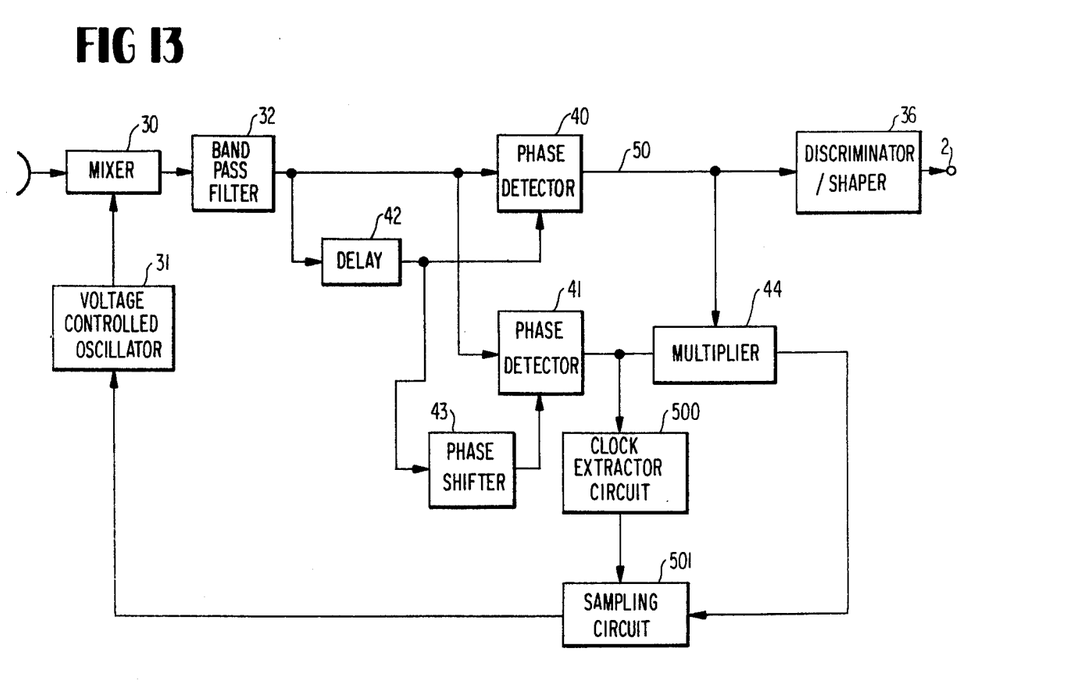
FIGS. 13 and 14 are block diagrams showing still further examples of the FSK demodulator apparatus according to the present invention.
Figure 14:
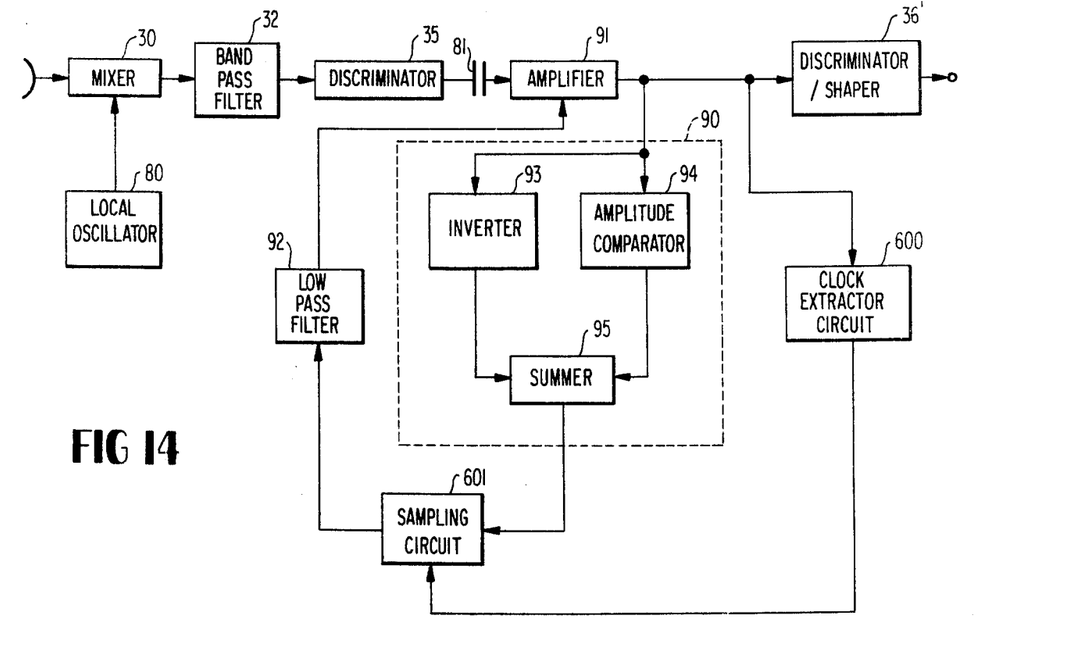

Even if the modulation pulses are perfect NRZ pulses, the waveform of the information would be rounded due to band suppression in the transmission path. This results in the small S/N ratio in the loop control. Therefore, as shown in FIGS. 13 and 14, the sampling circuits 501 and 601 are inserted on the output side of the multiplier circuit 44 and the discriminator 90, respectively. In addition, the clock extractor circuits 500 and 600 are provided between the sampling circuit 501 and the phase detector circuit 41 and between the sampling circuit 601 and the amplifier 91, respectively. In the sampling circuits 501 and 601, the output signals from the multiplier circuit 44 and the discriminator 90 are sampled by the clock pulse from the clock extractor circuits 500 and 600 to be fed to the voltage controlled oscillator 31 and the amplifier 91, respectively, thereby to improve the S/N ratio. In addition, owing to the fact that an excellent reproduction can be achieved by employing the apparatus according to the present invention even if digital information is transmitted with its D.C. component and its neighborhood cut off on the transmitter side as described above, it becomes possible to utilize this D.C. region for transmission of supervisory control signals to be used for maintenance of a transmission path, or for self-control of frequency stabilization of a control path such as AFC.

As described above, according to the present invention, it is possible to transmit a digital signal containing a D.C. component through an A.C.-coupled transmission path without degrading the bit error rate characteristic by employing the FSK demodulator. Accordingly, the FDM-FM techniques in the prior art can be effectively utilized for constructing a radio transmission path employing FSK, and yet the excellent nature of the transmission path with respect to non-linearity is not deteriorated. This implies that as the high frequency transmitted through a transmission path is raised such as quasi-millimeter wave region, millimeter region, etc., the advantage becomes more remarkable, and construction of a digital transmission path of large capacity and low cost is facilitated.

What is claimed is:

1. An FSK demodulator apparatus for receiving and demodulating an FSK-modulated signal that is transmitted with $n$ transmitting frequencies made to correspond to $n$-level ($n$ being a positive integer equal to or larger than 2) information signals, respectively, comprising a variable frequency oscillator whose frequency is variable in response to a control signal, a frequency converter circuit for converting said FSK-modulated signal into an intermediate frequency signal by means of an output of said oscillator, and means responsive to the output of said converter circuit for generating said $n$-level information signals and said control signal having at least $n$ frequency-stable points which correspond to said $n$ transmitting frequencies.

2. An FSK demodulator apparatus as claimed in claim 1, in which said signal generating means is composed of a delay circuit for delaying the output signal of said converter circuit for a period less than one signal period, a first phase detector for detecting a phase difference between the output signal of said converter circuit and the output signal of said delay circuit, a phase-shifter for phase-shifting the output signal of said delay circuit by 90°, a second phase detector for detecting a phase difference between the output signal of said converter circuit and the output signal of said phase-shifter, means for processing the output signals of at least said first and second phase detector circuits to derive said control signal at its output, and discriminator/shaper means for discriminating the output signal of said first phase detector circuit to derive said $n$-level information signals at its output.

3. An FSK demodulator apparatus as claimed in claim 2, in which said processing means consists of a multiplier circuit for multiplying the output signals of said first and second phase detector circuits.

4. An FSK demodulator apparatus as claimed in claim 2, in which said processing means consists of means for inverting the output signal of said second phase detector circuit depending upon whether the output signal of said first phase detector circuit is positive or negative.

5. An FSK demodulator apparatus as claimed in claim 2, in which said processing means consists of means for converting the output signals of said first and second phase detector circuits, respectively, into logic levels which correspond to the positive and negative values, respectively, of said output signals, and means for providing an Exclusive-OR function of the outputs of said level converting means and emitting its output as the output of said processing means.

6. An FSK demodulator apparatus as claimed in claim 1, in which said signal generating means is composed of means for discriminating said $n$ frequencies out of the output signal of said converter circuit, discriminator/shaper means for discriminating the output signal of said discriminator means and deriving said $n$-level information signals at its output, an inverter circuit for inverting the polarity of the output of said discriminator means, and means for adding the output signal of said inverter circuit with the output signal of said discriminator/shaper means and emitting the sum as the output of said signal generating means.

7. An FSK demodulator apparatus as claimed in claim 1, in which said signal generating means is composed of a delay circuit for delaying the output of said converter circuit for a period less than one signal period, a first phase detector circuit for detecting a phase difference between the output signal of said converter circuit and the output signal of said delay circuit, a phase-shifter for phase-shifting the output signal of said delay circuit by 90°, a second phase detector circuit for detecting a phase difference between the output signal of said converter circuit and the output signal of said phase-shifter, a frequency discriminator circuit for discriminating the output frequency of said converter circuit in a step-like manner, means for processing the output signals of said first and second phase detector circuits and the output signal of said discriminator circuit to drive said control signal at its output, and discriminator/shaper means for discriminating the output signal of said first phase detector circuit to derive said $n$-level information signals at its output.

8. An FSK demodulator apparatus as claimed in claim 1, further comprising a sampling circuit provided between the output of said signal generator means and the input of said oscillator, which is operable in response to signals synchronized to said modulated signal.

9. An FSK demodulator apparatus for receiving and demodulating an FSK-modulated signal that is transmitted with $n$ transmitting frequencies made to correspond to $n$-level ($n$ being a positive integer equal to or larger than 2) information signals, respectively, comprising means for frequency-discriminating said modulated signal to derive at its output $n$-level discrimination signals which correspond to said $n$ transmitting frequencies, a differential amplifier having the output of said discriminator circuit coupled to one of its input terminals, means responsive to the output signal of said amplifier for generating a signal having at least $n$ level-stable points which correspond to said $n$-level discrimination signals, means for applying the output of said signal generating means to the other input terminal of said differential amplifier, and discriminator/shaper for discriminating the output signal of said amplifier to derive said $n$-level information signals.

10. An FSK demodulator apparatus as claimed in claim 9, in which said signal generating means in composed of an inverter circuit for inverting the polarity of the output signal of said differential amplifier, a level detector for detecting the output signal of said differential amplifier at a level, and means for adding the output signal of said inverter circuit with the output signal of said level detector and emitting the sum at the output of the signal generating means.

11. An FSK demodulator apparatus as claimed in claim 9, in which said means for applying the output of said signal generating means to the other input terminal of said differential amplifier consists of a sampling circuit that is operable in response to signals synchronized to said modulated signal.

12. In an FSK demodulator apparatus for receiving and demodulating an FSK-modulated signal that is transmitted with $n$ transmitting frequencies made to correspond to signals formed by cutting off low frequency components from $n$-level digital signals containing a D.C. component, wherein the improvement in said apparatus comprises a negative feedback loop having at least $n$ stable points which correspond to said $n$ transmitting frequencies, the cut-off frequency of said negative feedback loop being selected higher than the cut-off frequency of said low frequency components.

* * * * *